(12) United States Patent
Estes et al.

(10) Patent No.: US 11,847,671 B2
(45) Date of Patent: Dec. 19, 2023

(54) SMART CAMPAIGN WITH AUTOPILOT FEATURES

(71) Applicant: Bluecore, Inc., New York, NY (US)

(72) Inventors: Bryan Estes, Seattle, WA (US); Amber Victoria Tunnell, Brooklyn, NY (US); Stephen Papa, San Jose, CA (US); Max Solomon Bennett, Brooklyn, NY (US); Jennifer Wang Hou, Brooklyn, NY (US); Francesco Fraioli, Brooklyn, NY (US); Connie Chau, New York, NY (US); Bahar Bipin Shah, New York, NY (US); Zahi Nadim Karam, Brooklyn, NY (US)

(73) Assignee: Bluecore, Inc., New York, NY (US)

( * ) Notice: Subject to any disclaimer, the term of this patent is extended or adjusted under 35 U.S.C. 154(b) by 0 days.

(21) Appl. No.: 15/930,349

(22) Filed: May 12, 2020

(65) Prior Publication Data
US 2020/0387936 A1    Dec. 10, 2020

Related U.S. Application Data

(60) Provisional application No. 62/858,141, filed on Jun. 6, 2019.

(51) Int. Cl.
*G06Q 30/0251* (2023.01)
*G06Q 30/0241* (2023.01)
(Continued)

(52) U.S. Cl.
CPC ......... *G06Q 30/0276* (2013.01); *G06N 20/00* (2019.01); *G06Q 10/0637* (2013.01);
(Continued)

(58) Field of Classification Search
CPC .......... G06Q 30/0276; G06Q 30/0271; G06Q 30/0252; G06Q 30/0255; G06Q 30/0631
See application file for complete search history.

(56) References Cited

U.S. PATENT DOCUMENTS

| | | | |
|---|---|---|---|
| 7,013,290 B2* | 3/2006 | Ananian | G06Q 30/02 705/26.42 |
| 7,552,069 B2* | 6/2009 | Kepecs | G06Q 30/0238 705/14.25 |

(Continued)

FOREIGN PATENT DOCUMENTS

WO    WO2020205492 A1    10/2020

OTHER PUBLICATIONS

Aarki, Inc., "The Importance of Frequency Management," [online], Sep. 4, 2017 [retrieved on Jun. 18, 2021], Retrieved from the Internet: <URL:https://web.archive.org/web20170904021955/https://WWW.aarki.com/blog/the- importance-of-frequency-management>2 pages.

(Continued)

*Primary Examiner* — Azam A Ansari
(74) *Attorney, Agent, or Firm* — Carr & Ferrell LLP

(57) ABSTRACT

Methods and systems are provided for communication of one or more campaigns via personalized electronic messaging. An example method includes automatically creating an electronic communication personalized for each of a plurality of individual customers of a client. The automatically creating may include dynamic configuring the electronic communication for each individual customer into a single campaign for the client to optimize both relevancy for each of a plurality of individual customers and one or more desired business outcomes for the client. The dynamic configuring can include decision making using at least a business context. Performance goals of a business can comprise the business context. The decision-making can (Continued)

further use a user context and/or an external context. The electronic communication can be dynamically configured to include personalized recommendations and may further include personalized content and/or a personalized offer. Using various embodiments, marketing strategies for electronic communication can run on autopilot.

20 Claims, 3 Drawing Sheets

(51) Int. Cl.
    *G06N 20/00*     (2019.01)
    *G06Q 10/107*     (2023.01)
    *G06Q 30/0601*     (2023.01)
    *G06Q 10/0637*     (2023.01)

(52) U.S. Cl.
    CPC ....... *G06Q 10/107* (2013.01); *G06Q 30/0252* (2013.01); *G06Q 30/0255* (2013.01); *G06Q 30/0271* (2013.01); *G06Q 30/0631* (2013.01)

(56) References Cited

U.S. PATENT DOCUMENTS

| | | | |
|---|---|---|---|
| 9,356,889 B2* | 5/2016 | Caskey | H04L 51/02 |
| 11,238,502 B2 | 2/2022 | Collet et al. | |
| 11,270,340 B2 | 3/2022 | Knodel et al. | |
| 2001/0014868 A1 | 8/2001 | Herz et al. | |
| 2002/0184139 A1 | 12/2002 | Chickering et al. | |
| 2004/0036622 A1 | 2/2004 | Dukach et al. | |
| 2007/0127650 A1 | 6/2007 | Altberg et al. | |
| 2007/0244766 A1 | 10/2007 | Goel | |
| 2007/0271134 A1 | 11/2007 | Ferry et al. | |
| 2012/0066065 A1 | 3/2012 | Switzer | |
| 2012/0239484 A1* | 9/2012 | Tobias | G06Q 30/0277 705/14.35 |
| 2013/0024211 A1* | 1/2013 | Monteforte | G06Q 30/0268 705/3 |
| 2014/0006142 A1 | 1/2014 | Gaudet et al. | |
| 2014/0032265 A1 | 1/2014 | Paprocki | |
| 2014/0143803 A1 | 5/2014 | Narsimhan et al. | |
| 2014/0278918 A1 | 9/2014 | Moran | |
| 2015/0026719 A1 | 1/2015 | Menon | |
| 2015/0213372 A1 | 7/2015 | Shah | |
| 2015/0348134 A1 | 12/2015 | Jiang et al. | |
| 2016/0189202 A1 | 6/2016 | Wang et al. | |
| 2016/0253709 A1 | 9/2016 | Chen | |
| 2017/0004408 A1 | 1/2017 | Edelen et al. | |
| 2017/0223137 A1 | 8/2017 | Yu et al. | |
| 2017/0236131 A1* | 8/2017 | Nathenson | G06Q 30/0631 705/26.7 |
| 2018/0012253 A1 | 1/2018 | Gavlovski et al. | |
| 2018/0082213 A1 | 3/2018 | McCord | |
| 2018/0189843 A1 | 7/2018 | Kulkarni et al. | |
| 2018/0219808 A1 | 8/2018 | Wala et al. | |
| 2018/0240147 A1 | 8/2018 | Stevens et al. | |
| 2018/0365753 A1* | 12/2018 | Fredrich | G06F 40/205 |
| 2019/0034976 A1* | 1/2019 | Hamedi | G06Q 30/0243 |
| 2019/0295004 A1 | 9/2019 | Chaturapruek | |
| 2019/0303980 A1 | 10/2019 | Yan et al. | |
| 2020/0027124 A1 | 1/2020 | Knodel et al. | |
| 2020/0320580 A1 | 10/2020 | Collet et al. | |

OTHER PUBLICATIONS

Donnelly, "The Mising Link to Email Marketing Success—Frequency Optimization," [online], Dec. 10, 2017 [retrieved on Jun. 18, 2021], Retrieved from the Internet: <URL:https://www.theseventhsense.com/blog/email-send-frequncy-optimization>, 5 pages.

Knodel et al., "Automatic Frequency Capping," U.S. Appl. No. 16/448,419, filed Jun. 21, 2019, Specification, Claims, and Drawings.

"International Search Report" and "Written Opinion"; Patent Cooperation Treaty Application No. PCT/US2020/025163; dated Jun. 19, 2020; 7 pages.

Kar et al., "Selection and Ordering of Linear Online Video Ads." In Proceedings of the 9th ACM Conference on Recommender Systems (RecSys '15). Association for Computing Machinery, New York, NY, USA, Sep. 16-20, 2015, pp. 203-210.

* cited by examiner

SMART CAMPAIGN WITH AUTOPILOT FEATURES

CROSS REFERENCE TO RELATED APPLICATION

This application claims the benefit of U.S. Provisional Application No. 62/858,141 filed Jun. 6, 2019, which is hereby incorporated by reference in its entirety.

FIELD

The present technology relates generally to communications and more specifically, to automatically creating a dynamically configured personalized communication for a campaign with autopilot features.

SUMMARY

This summary is provided to introduce a selection of concepts in a simplified form that are further described in the Detailed Description below. This summary is not intended to identify key or essential features of the claimed subject matter, nor is it intended to be used as an aid in determining the scope of the claimed subject matter.

In various embodiments, methods and corresponding systems for providing a smart campaign that can be fully powered by various autopilot features. According to various embodiments, the method and systems of the present technology remove the manual effort and redundancy of deciding and configuring the audience and specific visual presentation across several campaigns in order to execute a dynamically personalized and more robust electronic communication strategy. The smart campaign with autopilot (also referred to herein as the autopilot smart campaign, or smart campaign for short) can also eliminate the constraint which caused selecting only a subset of potential categories to segment on, due to inherent time/resource limitations introduced by the workflow for known systems.

One example method for communication via electronic messaging comprises automatically creating an electronic communication personalized for each of a plurality of individual customers of a client, including: dynamic configuring the electronic communication for each of a plurality of individual customers into a single campaign for the client to optimize both relevancy for each of a plurality of individual customers and desired business outcomes for the client. In various embodiments, the dynamic configuring includes decision-making using a business context. The automatic aspects and dynamic configuring can achieve a state of autopilot such that marketing strategies for electronic communication can effectively run on autopilot, according to various embodiments. In some embodiments, a user context and/or an external context may also be used. In various embodiments, a machine learning model is trained and utilized for various aspects of the decision making.

DETAILED DESCRIPTION

Figure 1:
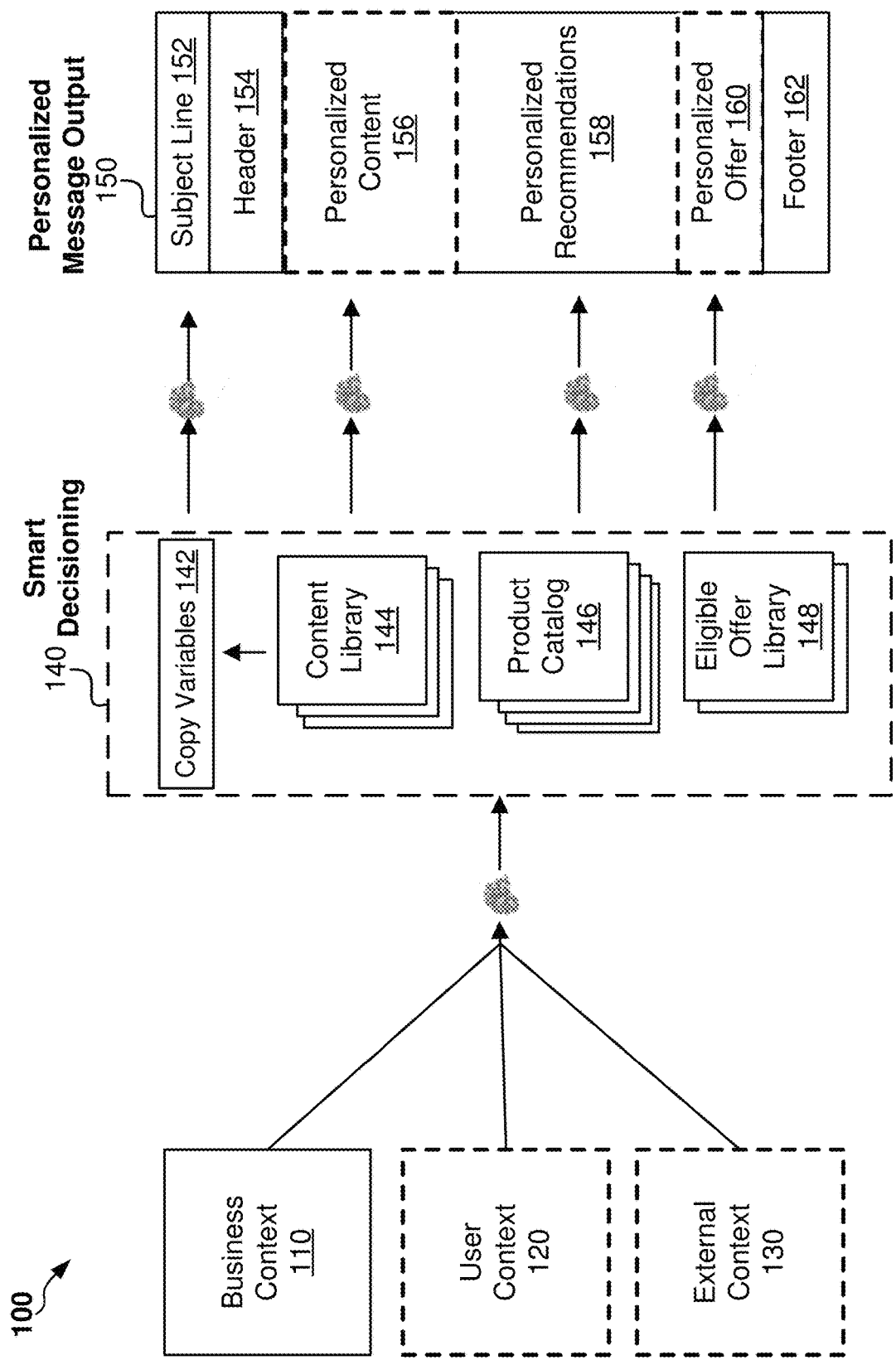
FIG. 1 is a simplified flow diagram of an example process according to various embodiments.

The following detailed description includes references to the accompanying drawings, which form a part of the detailed description. The drawings show illustrations in accordance with example embodiments. These example embodiments, which are also referred to herein as "examples," are described in enough detail to enable those skilled in the art to practice the present subject matter. The embodiments can be combined, other embodiments can be utilized, or structural, logical, and electrical changes can be made without departing from the scope of what is claimed. The following detailed description is therefore not to be taken in a limiting sense, and the scope is defined by the appended claims and their equivalents. In this document, the terms "a" and "an" are used, as is common in patent documents, to include one or more than one. In this document, the term "or" is used to refer to a nonexclusive "or," such that "A or B" includes "A but not B," "B but not A", and "A and B", unless otherwise indicated.

The techniques of the embodiments disclosed herein may be implemented using a variety of technologies. For example, the methods described herein may be implemented in software executing on a computer system or in hardware utilizing either a combination of microprocessors or other specially designed application-specific integrated circuits, programmable logic devices, or various combinations thereof. In particular, the methods described herein may be implemented by a series of computer-executable instructions residing on a storage medium, such as a disk drive or computer-readable medium. It should be noted that methods disclosed herein can be implemented by a computing device (e.g., a desktop computer, a tablet computer, a laptop computer, or other computing device). The methods disclosed herein can also be implemented by a computing system implemented as a cloud-based computing environment, such as a virtual machine or container operating within a computing cloud.

In general, an entity may wish to conduct an organized course of action to promote and sell a product or service, which may be referred to as a campaign. The entity may be a business or an individual. Traditionally, the entity may desire that the campaign include electronic communications to certain intended recipients, including customers or potential customers. The entity may determine the recipients and visual presentation of an electronic communication by defining specific behavior and/or customer criteria as well as products, content and/or offers that should be shown to the recipients of the campaign. The business entity conventionally does this by manually combining these elements together through an audience, electronic communication template of some kind, and assigned 'recipe rules'. A 'recipe rule' can define a specific strategy for dynamically populating products (e.g., best-selling products from the last seven days from the same category of the product a customer abandoned in their cart). The entity would then be constrained to apply this specific "recipe-rule" and electronic communication template configuration for all recipients, or to alternatively, duplicate the process for each recipient in order to further segment this audience to execute more granular personalization strategies. Examples of campaigns with their audiences, templates for the electronic communication, and associated products, are shown below:

1. Example Campaign (Requires 1 Campaign)
   Audience: Customers who browsed in the last 30 days and did not purchase Template: Branded content with sitewide 20% off promotion (promo)
Products: Best-selling products from the last 7 days from the same category of the last product the customer browsed.

2. Example Campaign with Basic Discount Preference Segmentation (Requires 2 Campaigns)
  Audience 1: Customers who browsed in the last 30 days and did not purchase and have a strong discount preference
  Template 1: Branded content with sitewide 20% off promo
  Products 1: Best-selling products from the last 7 days from the same category of the last product the customer browsed.
  Audience 2: Customers who browsed in the last 30 days and did not purchase and have no discount preference
  Template 2: Branded content without a promo
  Products 2: Best-selling products from the last 7 days from the same category of the last product the customer browsed.

3. Example Campaign with Category Affinity Segmentation (Requires n Campaigns)
  Audience 1: Customers who browsed in the last 30 days and did not purchase and have a strong affinity for Category A
  Template 1: Category A content
  Products 1: Best-selling products from the last 7 days from Category A
  Audience 2: Customers who browsed in the last 30 days and did not purchase and have a strong affinity for Category B
  Template 2: Category B content
  Products 2: Best-selling products from the last 7 days from Category B
  Audience 3: Customers who browsed in the last 30 days and did not purchase and have a strong affinity for Category C
  Template 3: Category C content
  Products 3: Best-selling products from the last 7 days from Category C
  Audience n: Customers who browsed in the last 30 days and did not purchase and have a strong affinity for Category N
  Template n: Category N content
  Products n: Best-selling products from the last 7 days from Category N Method and systems according to various embodiments can remove the manual effort and redundancy involved with deciding and configuring the audience and specific visual presentation across several campaigns in order to execute a personalized electronic communication strategy. Various embodiments can also eliminate the constraint which caused selecting only a subset of potential categories to segment on, due to inherent time/resource limitations introduced by the workflow for known systems.

In various embodiments, the present smart campaign technology provides an autonomous decision-making product that dynamically creates an electronic communication that is personalized for each individual customer through the configuration of a single campaign for a client. The automatic aspects and dynamic configuring can achieve a state of autopilot such that marketing strategies for electronic communication can effectively run on autopilot, according to various embodiments. The autopilot aspect can provide personalized features in a dynamically configured way. The personalized features include but are not limited to one or more personalized recommendations, personalized content, personalized offers, or a combination of these. The electronic communication may be, for example, an email message, text message, or other type of electronic message suitable for practicing various embodiments. The communication may be for marketing purposes (a marketing communication) or other purposes consistent with this specification.

The system can be aware of the customer's situation and the desired business outcome(s) of the client in order to determine the right "reason" to send the electronic communication. In this context, the term "reason" can be associated with a coherent message that is communicated to a customer through a combination of product recommendations, content and/or offer(s). For example, one "reason" to send a customer an electronic communication might be to inform them about products that the customer cares about which have recently been discounted; in order to achieve a particular business outcome (e.g., driving a second purchase, etc.). In this example regarding driving a second purchase, the "situation" of the customer can be that of being a one-time buyer with a known preference toward a specific set of products. The desired business outcome in this particular example is to maximize the likelihood of converting one-time buyers into repeat buyers. This is just one example of the reasons to send an electronic communication, others are described elsewhere herein.

In various embodiments, there are three distinct categories of information processed through the decision-making process, which includes continuously learning by leveraging historical data and the outcomes of the decisions made, in order to maximize the likelihood of achieving the desired business outcome which is at least based on a business context. User context and/or external context may also be considered in some embodiments.

For the continuous learning aspect, a machine learning/AI model may be included in the decision-making process. In various embodiments, for the decision-making process, historical data and decision outcomes can be leveraged, at least in part, by having the machine learning/AI model trained on historical data as well the outcomes of the decisions made. Examples of historical data include a customer's historical response to offers, or what that customer bought in what size/color, to name just a few examples. Other historical data that is available may be used. In various embodiments, the model continuously learns based, at least in part, on observing and leveraging the outcome of decisions the model decided to take in the smart campaign and/or various other campaigns. For example, the smart campaign may have decided to show a customer a blue shoe, and depending on whether the customer interacts with that showing of the blue shoe can inform the model of the customer's preference. The model can learn based on those interactions and preferences and apply that learning to future decision making. In some embodiments, the outcome of decisions for prior campaigns involving the same or similar customers, and/or the same or similar products, may also be utilized.

In various embodiments, at least the business context may be considered/used for automatically and dynamically configuring a campaign. In some embodiments, a user context or an external context may also be used for a particular campaign in addition to the business context, or a combination of the user context and the external context along with the business context. Some non-limiting examples of these contexts are as follows:

(i) Business Context. This category can include understanding specific business performance goals and maximizing the likelihood of achieving performance goals such as overall or category-specific revenue growth, merchandising sell-thru rates, converting one-time buyers to repeat buyers, etc.

(ii) User Context. This category includes behavioral data such as electronic communication opens/views/clicks, onsite and instore interactions and purchases, etc. The behavioral data can also include derived data points such as predicted lifetime value, buyer lifecycle stage, category affinity, etc., and general data like age, geo-location, etc. The value can be in terms of engagement (which can include, but is not limited to value in terms of clicks, purchases or revenue).

(iii) External Context. This category includes understanding when events such as weather, physical store location, sporting event outcomes, and/or other external events such as a pandemic can have an effect on a customer and in turn, information regarding the external context may be used to increase the relevancy of a message. For example, it can be relevant to recommend cold weather apparel for customers experiencing snowy weather or to include an in-store promotional offer for a customer that lives nearby a physical store location. If the external context affects the ability of customers to visit a physical store location, the offer can be adjusted accordingly, e.g., to focus on online purchaser opportunities and offers; to alert customers in a particular area when a physical store location is open again for business and ready for customers to come back.

The business context, with or without one or more of the other contexts, can then contribute to personalization in deciding the best combination of message elements, including but not limited to, products, content and offers to show to a given customer when rendering an electronic communication in the electronic communication engine. The resulting electronic communication for each customer is personalized and intended to maximize both customer relevancy and desired business outcomes.

FIG. 1 is a simplified flow diagram of the example process 100 according to various embodiments. In this example, at least the business context 110 (and optionally the user context 120 and/or external context) can be considered in the Smart Decisioning block 140. In block 140 in this example, there are three libraries—a content library 144, a product catalog 146, and an eligible offer library 148. The "brain" symbol as used herein merely indicates that various techniques are being used according to various embodiments of the present technology and also that there can be learning and improving over time. Variables can be copied from some or all of the content library 144, the product catalog 146, and the eligible offer library 148 to a copy variables block 142.

The content library 144 can include content that the client indicates as eligible to show to customers/potential customers. The method in some embodiments can look at the content to determine if it makes sense to show it to particular customers/potential customers.

The product catalog 146 can include, for a "shoe" example, the kind of styles of shoes that is determined to make the most sense to show this customer/potential customer. For this shoe example, the method may look at the price point for the shoe, a certain color, a certain style, etc. for the customer/potential customer.

The eligible offer library 148 can include the types of offers that the client is willing to provide to customers or potential customers. The types of offers may include, for example, free shipping, 10% off, buy a pair of shoes and get a free pair of socks, to name a few types. Other types of offers may be used. In various embodiments, the method determines if it makes sense to give the particular offer or to select from a set of offers to give to this customer/potential customer.

One of the aims of various embodiments is to pull together a cohesive message that is relevant to the customer/potential customer, while also satisfying the business goals the client aims to achieve.

In some embodiments, a decision may be determined that there is no content to show a particular customer/potential customer and no offer to show this customer/potential customer, so the focus may then be the showing of product information from the product catalog to that customer/potential customer. It also may occur that a decision is made that there are two pieces of content and two offers that can be given, for example. In various embodiments, one of the business goals is to choose the lowest value offer of the available offers in order to get the maximum margin.

FIG. 1 also illustrates outputs of the smart decisioning block 140 being used by various embodiments to generate a personalized message output 150 for the electronic communication. The personalized message output 150 can include at least a subject line 152, a header 154, one or more personalized recommendations 158, and a footer 162. In some embodiments, the personalized message output 150 can also include a personalized content 156 and a personalized offer 160. In various embodiments, the subject line 152 can be dynamically determined based on product/category preference for the particular customer, as a function of the smart decisioning block 140, and/or based on other context such as name or geo-location. Personalized recommendations 158 can be dynamically chosen based on the user context including for example personal product preference, as a function of the smart decisioning block 140.

Figure 2:
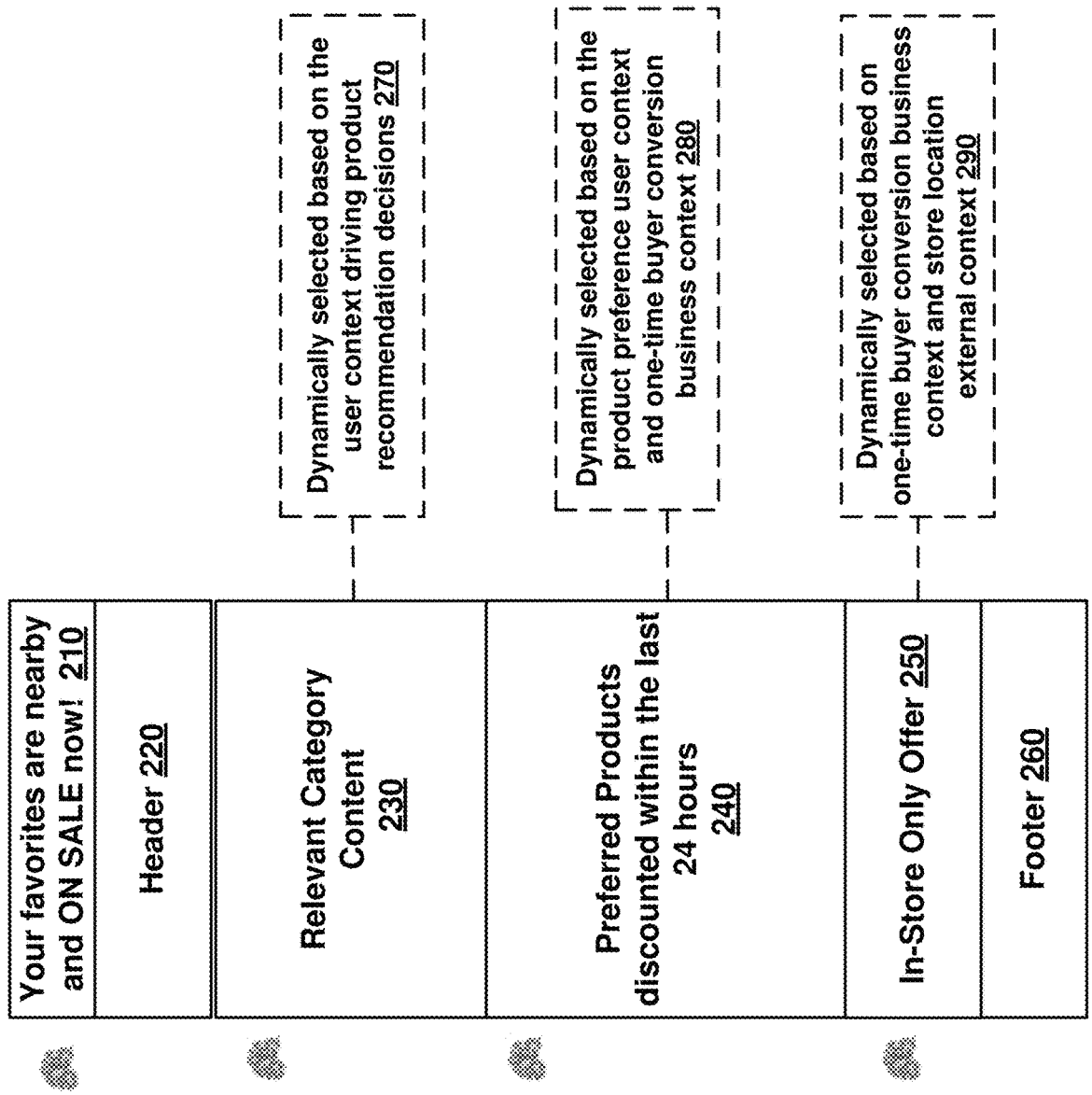
FIG. 2 shows an example communication as the resultant final output of the personalized message created using the process in the example in FIG. 1.

FIG. 2 provides an illustrative example 200 of the personalized message output 150 for an electronic communication. In the example in FIG. 2, the subject line 152 in FIG. 1 is the subject line "Your favorites are nearby and ON SALE now!" 210. The header 154 in FIG. 1 is the header 220 in the example embodiment in FIG. 2. The example in FIG. 2 includes example embodiments of the personalized recommendations 158 in FIG. 1 in the form of "Preferred Products discounted within the last 24 hours" at 240. This personalized recommendation may be dynamically selected based on the product preference user context and one-time buyer conversion context 280.

In FIG. 2, the personalized message output may also include an example embodiment 230 ("Relevant Category Content") of the personalized content 156 in FIG. 1. The "Relevant Category Content" portion in FIG. 2 in the electronic communication can be dynamically selected based on the user context driving product recommendation decisions in block 270 (e.g., based on "User Context", see FIG. 1).

In FIG. 2, the personalized message output may also include an example embodiment 250 ("In-Store Only Offer") of the personalized offer 160 in FIG. 1. The "In-Store Only Offer" 250 portion of the electronic communication may be dynamically selected based on one-time buyer conversion business context and store location external context in block 290 (e.g., based on embodiments of both the "Business Context" 110 and the "External Context" 130 in FIG. 1 in this example.

Thus, FIG. 2 illustrates just one example and includes an example at 240 of the personalized recommendations 158 of FIG. 1 plus an example at 230 of the optional personalized context 156 of FIG. 1 and an example at 250 of the optional personalized offer 160 of FIG. 1. As described above, the personalized content 156 and personalized offer 160 may one or both be optionally included in addition to the personalized recommendations 158.

The electronic communication may include, for example, an email message, text message, or other type of electronic message suitable for practicing various embodiments. The communication may be for marketing purposes (a marketing communication) or other purposes consistent with this specification.

Figure 3:
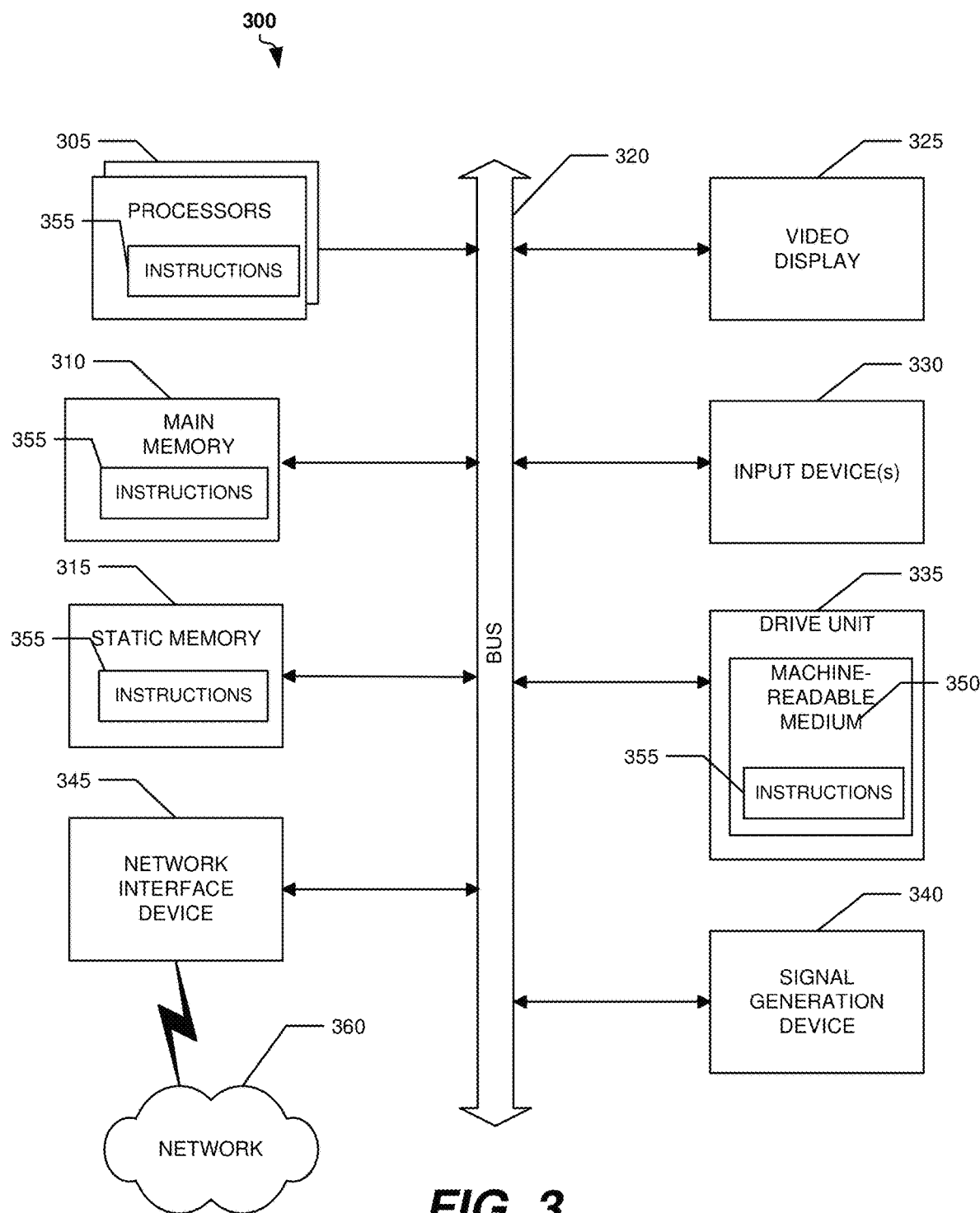
FIG. 3 is a simplified block diagram of a computing system, according to some embodiments.

FIG. 3 shows a diagrammatic representation of a computing device for a machine in an example electronic form of a computer system 300, within which a set of instructions for causing the machine to perform any one or more of the methods discussed herein can be executed. In example embodiments, the machine operates as a standalone device, or it can be operatively connected or networked to other machines. In a networked deployment, the machine can operate in the capacity of a server, a client machine in a server-client network environment, or as a peer machine in a peer-to-peer (or distributed) network environment. The machine can be a server, desktop personal computer (PC), laptop PC or any machine capable of executing a set of instructions that specify actions to be taken by that machine. Further, while only a single machine is illustrated, the term "machine" shall also be taken to include any collection of machines that separately or jointly execute a set (or multiple sets) of instructions to perform any one or more of the methodologies discussed herein.

The example computer system 300 includes a processor or multiple processors 305 (e.g., a central processing units (CPU), a graphics processing unit (GPU), or both), a main memory 310, and a static memory 315, which communicate with each other via a bus 320. Computer system 300 can further include a video display 325 (e.g., a LCD, projector). Computer system 300 also includes at least one input device 330, such as an alphanumeric input device (e.g., a keyboard, keypad, remote control, graphical user interface, etc.), a cursor control device (e.g., a mouse), a microphone, a digital camera, a video camera, and so forth. Computer system 300 also includes a disk drive unit 335, a signal generation device 340 (e.g., a speaker), and a network interface device 345.

Drive unit 335 (also referred to as the disk drive unit 335) includes a machine-readable medium 350 (also referred to as a computer-readable medium 350), which stores one or more sets of instructions and data structures (e.g., instructions 355) embodying or utilized by any one or more of the methodologies or functions described herein. Instructions 355 can also reside, completely or at least partially, within the main memory 310 and/or the processors 305 during execution thereof by computer system 300. Main memory 310 and processors 305 also constitute machine-readable media.

Instructions 355 can further be transmitted or received over a communications network 360 via network interface device 345 utilizing one or more transfer protocols (e.g., Hyper Text Transfer Protocol (HTTP), Serial, and Modbus). Communications network 360 includes the Internet, television network, local intranet, Personal Area Network (PAN), Local Area Network (LAN), Wide Area Network (WAN), Metropolitan Area Network (MAN), virtual private network (VPN), storage area network (SAN), frame relay connection, Advanced Intelligent Network (AIN) connection, synchronous optical network (SONET) connection, Digital Data Service (DDS) connection, Digital Subscriber Line (DSL) connection, Ethernet connection, Integrated Services Digital Network (ISDN) line, cable modem, Asynchronous Transfer Mode (ATM) connection, or a Fiber Distributed Data Interface (FDDI) or Copper Distributed Data Interface (CDDI) connection. Furthermore, communications also includes links to any of a variety of wireless networks including Wireless Application Protocol (WAP), General Packet Radio Service (GPRS), Global System for Mobile Communication (GSM), Code Division Multiple Access (CDMA) or Time Division Multiple Access (TDMA), cellular phone networks, Global Positioning System (GPS), cellular digital packet data (CDPD), Research in Motion, Limited (RIM) duplex paging network, Bluetooth radio, or an IEEE 802.11-based radio frequency network.

While machine-readable medium 350 is shown in an example embodiment to be a single medium, the term "computer-readable medium" should be taken to include a single medium or multiple media (e.g., a centralized or distributed database, and/or associated caches and servers) that store the one or more sets of instructions. The term "computer-readable medium" shall also be taken to include any medium that is capable of storing, encoding, or carrying a set of instructions for execution by the machine and that causes the machine to perform any one or more of the methodologies of the present application, or that is capable of storing, encoding, or carrying data structures utilized by or associated with such a set of instructions. The term "computer-readable medium" shall accordingly be taken to include, but not be limited to, solid-state memories, optical and magnetic media. Such media can also include, without limitation, hard disks, floppy disks, flash memory cards, digital video disks, RAM, ROM, and the like.

In some embodiments, the computer system 300 may be implemented as a cloud-based computing environment, such as a virtual machine operating within a computing cloud. In other embodiments, the computer system 300 may itself include a cloud-based computing environment, where the functionalities of the computer system 300 are executed in a distributed fashion. Thus, the computer system 300, when configured as a computing cloud, may include pluralities of computing devices in various forms, as will be described in greater detail below.

In general, a cloud-based computing environment is a resource that typically combines the computational power of a large grouping of processors (such as within web servers) and/or that combines the storage capacity of a large grouping of computer memories or storage devices. Systems that provide cloud-based resources may be utilized exclusively by their owners or such systems may be accessible to outside users who deploy applications within the computing infrastructure to obtain the benefit of large computational or storage resources.

The cloud is formed, for example, by a network of web servers that comprise a plurality of computing devices, such as the computer system 300, with each server (or at least a plurality thereof) providing processor and/or storage resources. These servers manage workloads provided by multiple users (e.g., cloud resource customers or other users). Typically, each user places workload demands upon the cloud that vary in real-time, sometimes dramatically. The nature and extent of these variations typically depends on the type of business associated with the user.

The example embodiments described herein can be implemented in an operating environment comprising computer-executable instructions (e.g., software) installed on a computer, in hardware, or in a combination of software and hardware. The computer-executable instructions can be written in a computer programming language or can be embodied in firmware logic. If written in a programming language conforming to a recognized standard, such instructions can be executed on a variety of hardware platforms and for interfaces to a variety of operating systems. Although not limited thereto, computer software programs for implementing the present method can be written in any number of suitable programming languages such as, for example, PYTHON, Hypertext Markup Language (HTML), Dynamic HTML, XML, Extensible Stylesheet Language (XSL), Document Style Semantics and Specification Language (DSSSL), Cascading Style Sheets (CSS), Synchronized Multimedia Integration Language (SMIL), Wireless Markup Language (WML), Java™, Jini™, C, C++, C#, .NET, Adobe Flash, Perl, UNIX Shell, Visual Basic or Visual Basic Script, Virtual Reality Markup Language (VRML), ColdFusion™ or other compilers, assemblers, interpreters, or other computer languages or platforms.

Although embodiments have been described with reference to specific example embodiments, it will be evident that various modifications and changes can be made to these example embodiments without departing from the broader spirit and scope of the present application. Accordingly, the specification and drawings are to be regarded in an illustrative rather than a restrictive sense.

What is claimed is:

1. A method, the method comprising:
performing continuous learning using decision outcomes of a machine learning model, the machine learning model also being trained on historical data, the historical data corresponding to a customer type, the historical data being stored on a server and retrieved by the machine learning model from the server, the historical data including actions performed by one or more of a plurality of individual customers of a client in response to one or more preceding electronic communications, the actions being performed with respect to at least one of the following: the one or more preceding electronic communications and a product or a service associated with the one or more preceding electronic communications;
determining at least two offers for a customer of the plurality of individual customers;
automatically creating an electronic communication personalized for each of the plurality of individual customers, the plurality of individual customers being similar to the customer type, the automatically creating including:
dynamically configuring the electronic communication with personalized content, product information and an offer, using decision making by the machine learning model, for each of the plurality of individual customers into a single campaign for the client that optimizes both relevancy for each of the plurality of individual customers and one or more desired business outcomes for the client; wherein the decision making uses the following:
user context comprising electronic communication clicks, on-site and in-store interactions and purchases, and predicted lifetime value,
external context comprising weather, physical store location, and sporting event outcomes, and
business context comprising merchandising sell-thru rates and converting one-time buyers to repeat buyers, the business context further comprising choosing a lowest value offer of the at least two offers for the customer of the plurality of individual customers in order to get a maximum margin;
determining if there is no personalized content to show the customer of the plurality of individual customers and no offer to show the customer of the plurality of individual customers;
in response to the determination there is no personalized content to show and no offer to show, selecting product information from a product catalog to the customer of the plurality of individual customers to be included in the electronic communication;
sending the electronic communication to one or more computing devices associated with the plurality of individual customers to display the electronic communication on the one or more computing devices; in response to the electronic communication, receiving a business outcome preference from the one or more computing devices associated with the plurality of individual customers;
using the business outcome preference to further train the machine learning model; and
further comprising behavioral data for a particular customer being used by the machine learning model for personalization to determine an optimal combination of message elements to include in a personalized message output, the personalized message output including at least a subject line, a header, one or more personalized recommendations, and a footer.

2. The method of claim 1, wherein the campaign is an organized course of action to promote and sell the product or the service.

3. The method of claim 1, wherein the external context further comprises an event affecting an ability of the customer to visit a physical store location.

4. The method of claim 1, wherein the business context includes one or more particular performance goals of a business.

5. The method of claim 4, wherein the one or more particular performance goals include overall or category-specific revenue growth, merchandising sell-thru rates, or converting one-time buyers to repeat buyers.

6. The method of claim 1, wherein the user context includes behavioral data for a particular user.

7. The method of claim 6, wherein the behavioral data includes electronic communication opens/views/clicks, or the on-site and in-store interactions and the purchases.

8. The method of claim 6, wherein the behavioral data includes derived data points wherein the derived data points include the predicted lifetime value, buyer lifecycle stage, category affinity, age, and/or geo-location.

9. The method of claim 8, wherein the predicted lifetime value is in terms of engagement in a form of clicks, purchases, and/or revenue.

10. The method of claim 1, wherein the electronic communication is dynamically configured to include the one or more personalized recommendations.

11. The method of claim 10, wherein the electronic communication is further dynamically configured to include the personalized content and/or a personalized offer.

12. The method of claim 1, wherein the electronic communication is dynamically configured to include the one or more personalized recommendations, along with a personalized content, and a personalized offer.

13. The method of claim 1, wherein the electronic communication is dynamically configured as an electronic message.

14. The method of claim 1, wherein the electronic communication includes an email message or a text message.

15. The method of claim 1, wherein the one or more desired business outcomes includes at least increasing a likelihood of converting the one-time buyers into the repeat buyers.

16. The method of claim 1, wherein the external context includes at least one of the following: the weather, a proximity of the customer to the physical store location, and a sporting event outcome.

17. The method of claim 1, further comprising a recipe rule to find for each of the plurality of individual customer's assortment of products, a product they are predicted to purchase next so as to execute increased granular personalization.

18. A system, the system comprising:
a hardware processor; and
a memory communicatively coupled with the hardware processor, the memory storing instructions which when executed by the hardware processor performs a method, the method comprising:
performing continuous learning using decision outcomes of a machine learning model, the machine learning model also being trained on historical data, the historical data corresponding to a customer type, the historical data being stored on a server and retrieved by the machine learning model from the server, the historical data including actions performed by one or more of a plurality of individual customers of a client in response to one or more preceding electronic communications, the actions being performed with respect to at least one of the following: the one or more preceding electronic communications and a product or a service associated with the one or more preceding electronic communications;
automatically creating an electronic communication personalized for each of the plurality of individual customers, the plurality of individual customers being similar to the customer type, the automatically creating including:
determining at least two offers for a customer of the plurality of individual customers;
dynamically configuring the electronic communication with personalized content, product information and an offer, using decision making by the machine learning model, for each of the plurality of individual customers into a single campaign for the client that optimizes both relevancy for each of the plurality of individual customers and one or more desired business outcomes for the client;
wherein the decision making uses the following:
user context comprising electronic communication clicks, on-site and in-store interactions and purchases, and predicted lifetime value,
external context comprising weather, physical store location, and sporting event outcomes, and
business context comprising merchandising sell-thru rates and converting one-time buyers to repeat buyers, the business context further comprising choosing a lowest value offer of the at least two offers for the customer on the plurality of individual customers in order to get a maximum margin;
determining if there is no personalized content to show the customer of the plurality of individual customers and no offer to show the customer of the plurality of individual customers;
in response to the determination there is no personalized content to show and no offer to show, selecting product information from a product catalog to the customer of the plurality of individual customers to be included in the electronic communication;
sending the electronic communication to one or more computing devices associated with the plurality of individual customers to display the electronic communication on the one or more computing devices;
in response to the electronic communication, receiving a business outcome preference from the one or more computing devices associated with the plurality of individual customers;
using the business outcome preference to further train the machine learning model; and
further comprising behavioral data for a particular customer being used by the machine learning model for personalization to determine an optimal combination of message elements to include in a personalized message output, the personalized message output including at least a subject line, a header, one or more personalized recommendations, and a footer.

19. A method for communication of one or more campaigns via personalized electronic messaging, the method comprising:
automatically creating an electronic communication personalized for each of a plurality of individual customers of a client, the automatically creating including:
dynamically configuring the electronic communication with personalized content, product information and an offer, for each of the plurality of individual customers into a single campaign for the client to optimize both relevancy for each of the plurality of individual customers and one or more desired business outcomes for the client, the dynamically configuring using at least a business context, the business context comprising merchandising sell-thru rates and converting one-time buyers to repeat buyers;
wherein the electronic communication is dynamically configured to include at least personalized recommendations;
training a machine learning model for performing some or all of decision making for the dynamically configuring, the training comprising performing continuous learning using decision outcomes of the machine learning model, the machine learning model also being trained on historical data, the historical data corresponding to a customer type that corresponds to the plurality of individual customers in type, the historical data being stored on a server and retrieved by the machine learning model from the server, the historical data including actions performed by one or more of the plurality of individual customers in response to one or more preceding electronic communications, the actions being performed with respect to at least one of the following: the one or more preceding electronic communications and a product or a service associated with the one or more preceding electronic communications;
determining at least two offers for a customer of the plurality of individual customers;
wherein the decision making uses the following:
user context comprising electronic communication clicks, on-site and in-store interactions and purchases, and predicted lifetime value,
external context comprising weather, physical store location, and sporting event outcomes, and
business context comprising merchandising sell-thru rates and converting one-time buyers to repeat buyers, the business context further comprising choosing a lowest value offer of the at least two offers for the customer in order to get a maximum margin;

determining if there is no personalized content to show the customer of the plurality of individual customers and no offer to show the customer of the plurality;

in response to the determination there is no personalized content to show and no offer to show, selecting product information from a product catalog to the customer of the plurality of individual customers to be included in the electronic communication;

sending the electronic communication to one or more computing devices associated with the plurality of individual customers to display the electronic communication on the one or more computing devices; in response to the electronic communication, receiving a business outcome preference from the one or more computing devices associated with the plurality of individual customers;

using the business outcome preference to further train the machine learning model; and further comprising behavioral data for a particular customer being used by the machine learning model for personalization to determine an optimal combination of message elements to include in a personalized message output, the personalized message output including at least a subject line, a header, one or more personalized recommendations, and a footer.

20. The method of claim 19, further comprising a recipe rule to find for each of the plurality of individual customer's assortment of products, a product they are predicted to purchase next using behavior and catalog context so as to execute increased granular personalization.

\* \* \* \* \*